Dec. 20, 1966 T. G. BOWE 3,292,265
NAVIGATION RULE
Filed Oct. 26, 1964
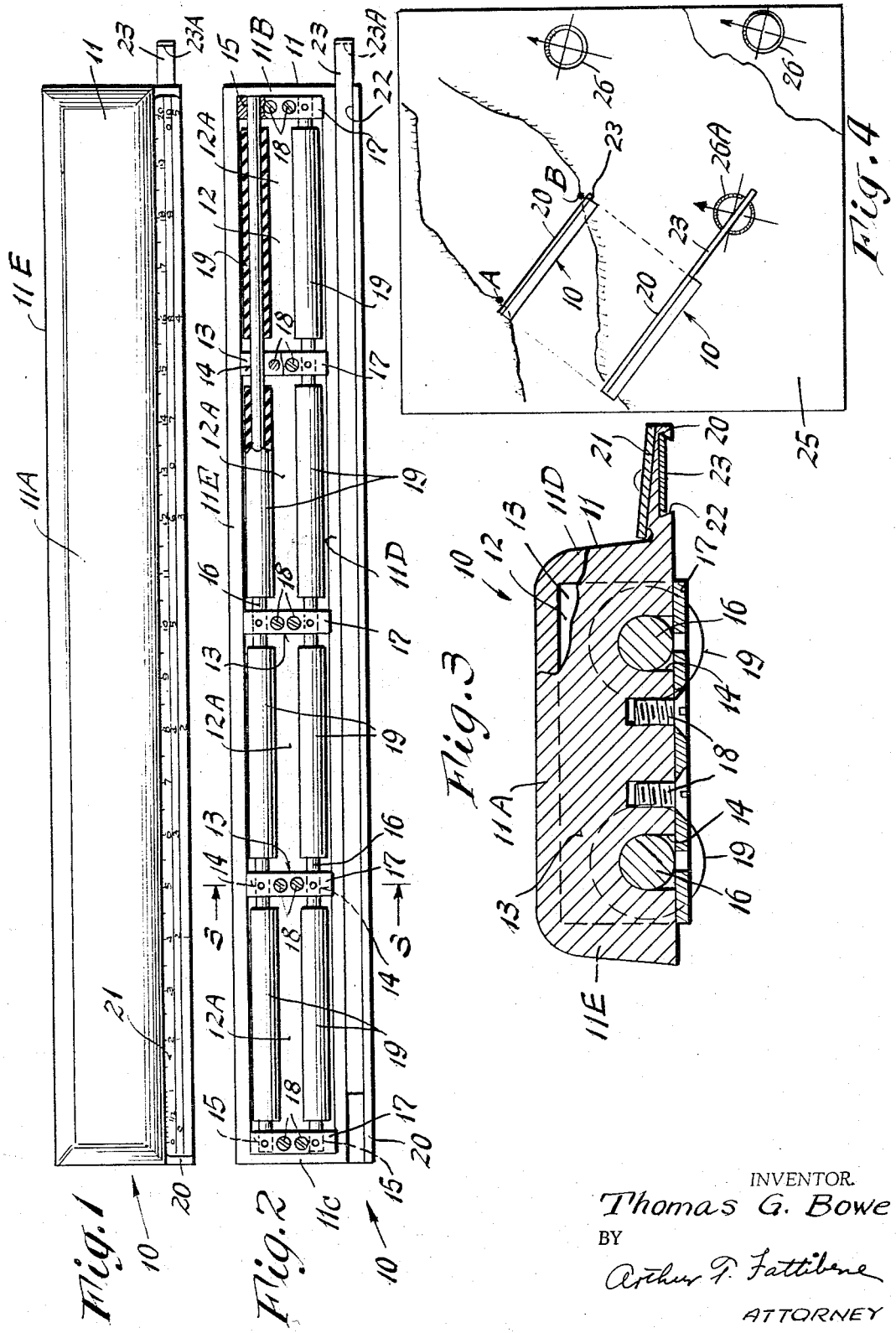
INVENTOR.
*Thomas G. Bowe*
BY
*Arthur F. Fattibene*
ATTORNEY

United States Patent Office 3,292,265
Patented Dec. 20, 1966

3,292,265
NAVIGATION RULE
Thomas G. Bowe, 1477 Broadbridge Ave.,
Stratford, Conn. 06497
Filed Oct. 26, 1964, Ser. No. 406,312
2 Claims. (Cl. 33—109)

This invention relates in general to a navigation rule, and more specifically to a navigation roller parallel rule for quickly and accurately determining a bearing of a course on a navigation chart.

Difficulty has often been encountered in determining a bearing of a course on a navigation map or chart. Navigation maps or charts are generaly provided with several compass roses at various locations thereon from which bearings are taken from time to time to plot or steer a course between two points on such charts. Therefore, to determine a bearing of a course charted on such maps it becomes necessary for the navigator to transpose a compass rose bearing or reading to a course charted between the two points he wishes to travel. At is frequently happens a compass rose on the chart is located at a distance remote from the desired course one wishes to take. For this reason it becomes necessary for the navigator to transpose and parallel the course charted between the two points to the nearest compass rose in order to determine the bearing thereof.

Heretofore, transposing a course to the nearest compass rose to determine the bearing thereof was accomplished by an instrument known as a one-arm protractor. While such one-arm protractors operated satisfactorily, they are difficult to manipulate and require the use of both hands. This is due to the fact that in transposing a course between two points with such a protractor it is necessary for the navigator first to locate the center of the one-arm protractor over the point of departure and then rotate the arm thereof to extend to the nearest compass rose. The protractor then has to be oriented to the compass rose of the chart. With the readings of the protractor oriented to the compass rose, the navigator is then required to hold the protractor in its oriented position and move the arm to the point of destination with the bearing being read from the protractor. Consequently, the reading of a bearing on a chart with a one-arm protractor rule requires the use of both hands and several operations, in which any inadvertent movement of the instrument during any of the operations introduces error in the reading. Therefore, extreme care had to be taken on the part of the navigator to insure an accurate bearing reading with such an instrument.

Another instrument, which has also been used to transpose a course to and parallel to a compass rose, is a walking parallel rule. Such parallel rules comprise merely a pair of straight edges which are interconnected by pivoting links. To take a bearing with such parallel rules the navigator is required to walk the parallel rules from the plotted course to the nearest compass rose in a series of short steps across the chart. In manipulating such parallel rules, a navigator is also required to utilize both hands in walking the rule across the chart. Consequently, any inadvertent movement or shifting of the parallel rules in walking the same will render the bearing reading inaccurate.

Another difficulty which has been noted in reading a bearing of a course from a compass rose on a chart is that it frequently happens the nearest compass rose to a plotted course cannot be reached due to insufficient rule length. When this condition occurs, considerable difficulty is encountered in making a reasonably accurate reading.

It is therefore an object of this invention to provide an improved roller parallel rule with which a bearing of a course charted between two points can be quickly and accurately determined with a minimum of effort and a maximum of ease.

It is another object of this invention to provide an improved roller parallel rule constructed and arrranged to insure positive parallel transposition of a plotted course to a compass rose to determine the compass bearing or reading of the course.

Another object is to provide an improved roller parallel rule which can be readily extended if necessary to parallel a course to an otherwise remotely disposed compass rose.

Still another object of this invention is to provide a roller type rule which is relatively simple in construction, inexpensive to manufacture, and positive in operation.

Other features and advantages will become more readily apparent when considered in view of the drawings and specifications in which:

FIG. 1 illustrates a top plan view of the improved roller parallel rule of the instant invention.

FIG. 2 illustrates a bottom plan view of the roller parallel rule of FIG. 1.

FIG. 3 is a sectional view of the parallel rule taken along line 3—3 of FIG. 2, and FIG. 4 is a view of a navigation chart illustrating the use of the instant rule in conjunction therewith.

Referring to the drawings, there is shown the improved roller parallel rule 10 of the instant invention. The rule comprises essentially of an elongated body or housing 11 formed with a longitudinally extending recess 12 in the lower surface thereof. As best seen in FIG. 2, the recess 12 extends substantially the entire length of the body or housing, the recess 12 being defined by the top 11A, opposed end wall portions 11B, 11C and opposed side wall portions 11D, 11E of the body.

As shown in FIG. 2, a plurality of transversely extending web portions 13 are longitudinally spaced between the opposed end walls of the body to partition the recess into a plurality of chambers 12A. Preferably the transverse web portions 13 are equidistantly spaced between the ends 11B, 11C of the housing 11 with the bottom edge portion thereof being substantialy coplanar with the bottom of the housing. Formed in each of the respective web portions are a pair of cut out or notched out bearing portions 14, the respective bearing portions 14 in each of the web portions 13 are disposed in longitudinal alignment. The respective end walls 11B, 11C of the housing are formed with a cut out portion 15 to define a bearing for the ends of a pair of axles or shafts 16 which extend the length of the recess and are respectively accommodated in the cut out bearing portions 14, 15 defined in the transversely extending webs and the ends of the housing respectively. Means in the form of a plate 17 extending transversely across the open ends of the bearing portion 14, 15 are utilized to retain the shafts 16 in position within the respective bearing portions of each web portion and fastening means such as screws 18 or the like are utilized for fastening the retaining plates 17 in position against the bottom of the respective web portions 13 and the ends of the body.

In accordance with this invention a plurality of rollers 19 are secured and longitudinally spaced along the respective shafts 16. As seen in FIG. 3, a circumferential portion of the rollers 19 extend below the bottom of the housing. Preferably, the rollers 19 are formed of elongated tubular members out of a material having a non-skid surface, as for example rubber or the like.

The construction and arrangement of the roller parallel rule 10 described is such that it can be readily rolled over the surface of the chart in a positive and accurate manner without sliding. Thus, the utilization of the non-skid rubber rollers 19 provides positive traction that requires a considerable amount of force to divert the parallel rolling movement of the rule. For this reason, an accurate parallel transposition of a course to an adjacent compass rose can be made with great ease and much accuracy even under the most adverse conditions. Consequently, a navigator can take a bearing of a desired course between a point of departure to a destination with great accuracy.

The straight edge of the rule is defined by a flange or lip portion 20 that projects laterally to one side of the body 11 and extends substantially co-extensive the length of the housing. Mounted on the top surface of the flange 20 is a scale 21 by which distances between two points may be measured. In the illustrated embodiment, the scale 21 has its indices marked off in nautical miles in one or more scales usually associated with navigational charts, e.g. 1–20,000, 1–40,000 or 1–80,000 ratios. However, any other suitable scale markings or indices may be utilized in conjunction with the instant rule.

As shown in FIG. 4, a navigational chart 25 has a plurality of compass roses 26 conveniently located thereon. The location of the roses 26 are generally located so that a bearing may be taken therefrom for most any course plotted on the chart by using a parallel rule, as herein described.

However, it often happens that the nearest compass rose e.g. 26A to a plotted course, e.g. course A, B, cannot be transposed to the nearest compass rose 26A because of insufficient rule length, as shown in FIG. 4.

To avoid this difficulty, the instant invention contemplates incorporating a means in the rule 10 whereby the straight edge 20 thereof may be extended so that a bearing reading under such conditions can be effected.

As seen in FIGS. 2 and 3, the lower surface of the flange 20 is provided with a keyway or slot 22 that extends substantially the length thereof. Disposed within the keyway 22 so as to slide relative thereto is a slide 23. In the illustrated embodiment the slide 23 is provided with a length which is substantially coextensive the length of the keyway 22. Thus, it will be readily apparent that in the extreme extended position of the slide, as seen in FIG. 4, the length of the rule 10 can be substantially doubled.

As seen in FIG. 4, whenever the position of the course A, B is such that paralleling the same to the nearest compass rose 26A is not possible due to insufficient rule length, then the navigator merely has to extend the slide 23 until it extends across the rose 26A so that the reading may be accurately made, thereby eliminating guess work.

To facilitate extension of the slide 23, the end thereof may be provided with an upturned tip 23A to define finger hold or grip. Also the finger hold 23A may function as a stop in the retracted position of the slide. If desired, suitable means may be provided to prohibit accidental removal of the slide 23 from the keyway 22 when extended to its extreme position.

While the instant embodiment illustrates a slide 23 coextensive to the length of the rule, it will be understood that a pair of slide segments (not shown) adapted to extend to either end of the flange keyway 22 may be provided. In this manner the rule may be extended from either end.

It is also contemplated that a pair of slides, each substantially co-extensive of the rule may be disposed in overlying or side-by-side relationship within the keyway 22 wherein one slide is arranged to extend to one side of the rule, and the other slide arranged to extend to the other end of the rule. In this manner it will be apparent that the straight edge of the rule can be extended a considerable amount.

If desired, the slide 23 may also have markings thereon similar to those of the scale 21 so that it may also function as an extension thereof.

While the instant invention has been described with reference to a particular embodiment thereof, it will be readily appreciated and understood that variations and modifications may be made without departing from the spirit and scope of the instant invention.

What is claimed is:

1. A navigational rule for quickly and accurately charting a course on a navigation chart comprising:
    (a) an elongated housing having a recess formed therein
    (b) said recess being substantially co-extensive the length of said housing,
    (c) a plurality of webs extending transversely of said recess at longitudinally spaced intervals therealong,
    (d) a pair of elongated shafts,
    (e) means formed in each of said webs and in the ends of said housing for accommodating each of said shafts,
    (f) means for rotatably journalling said shafts in said means,
    (g) and a means forming a non-skid surface disposed about each of said shafts,
    (h) each of said non-skid surfaces extending along the portion of said shaft extending between adjacent webs,
    (i) said housing including a laterally extending flange portion extending longitudinally thereof along an edge portion thereof to define a straight edge,
    (j) said flange being substantially coextensive the length of said body and disposed adjacent the bottom thereof,
    (k) means defining a scale fixed to the upper surface of said flange,
    (l) said flange having a keyway formed on the under surface thereof, said keyway extending longitudinally of said flange and
    (m) a slide slidably disposed in said keyway whereby said slide is rendered relatively movable with respect to said flange within said keyway to form an extension of said scale.

2. A navigation rule for quickly and accurately determining the bearing of a course charted on a navigation chart comprising:
    (a) an elongated body having longitudinally extending recess formed in the undersurface of said body,
    (b) a plurality of web portions spaced longitudinally of said recess and extending transversely of said recess for dividing the same into several chambers,
    (c) each of said web portions being formed with a pair of transversely spaced notched out bearing portions wherein the bearing portions of the respective web portions are disposed in longtudinal alignment,
    (d) a pair of shafts rotatably journalled in the aligned bearing portions of said webs,
    (e) means for journalling the ends of said shafts in the ends of said housing,
    (f) means for retaining the intermediate portion of said shaft within said bearing portions, said means for journalling the ends of the shaft in the ends of the housing and for retaining the intermediate portion of the shafts in the bearing portions of said webs include a retaining plate connected to the end of the housing and the respective webs, and fastening means for connecting said retainer plate to the respective webs and ends of said housing,
    (g) a plurality of elongated non-skid rollers fixed to and spaced along the length of each of said shafts,
    (h) said rollers having the circumferential portion thereof projecting slightly below the bottom of said body whereby said body is adapted to be rolled over a surface of a chart,
    (i) and a flange integrally formed to said body, said flange being substantially co-extensive the length of said body and projecting laterally outwardly therefrom to define a straight edge,
    (j) means defining a scale connected to the upper surface of said flange,
    (k) said flange having a keyway formed in the under surface thereof,
    (l) a slide disposed within said keyway for relative movement with respect thereto whereby the length of said straight edge may be extended in the event a compass rose on a chart is remotely disposed with respect to a plotted course on said chart.

References Cited by the Examiner

UNITED STATES PATENTS

| | | | |
|---|---|---|---|
| 149,532 | 4/1874 | Sherwin | 33—161 |
| 843,374 | 2/1907 | Sturgeon | 33—109 |
| 1,051,712 | 1/1913 | Eager | 33—109 |
| 1,081,995 | 12/1913 | Voggenreiter | 33—161 X |
| 2,064,142 | 12/1936 | Barany | 33—109 |

FOREIGN PATENTS

| | | |
|---|---|---|
| 40,811 | 2/1910 | Austria. |
| 18,247 | 1898 | Great Britain. |
| 355,483 | 8/1931 | Great Britain. |
| 345,407 | 1/1937 | Italy. |

LEONARD FORMAN, *Primary Examiner.*

H. N. HAROIAN, *Assistant Examiner.*